US011775693B1

(12) United States Patent
Mishra et al.

(10) Patent No.: US 11,775,693 B1
(45) Date of Patent: Oct. 3, 2023

(54) HARDWARE TROJAN DETECTION USING PATH DELAY BASED SIDE-CHANNEL ANALYSIS AND REINFORCEMENT LEARNING

(71) Applicant: University of Florida Research Foundation, Inc., Gainesville, FL (US)

(72) Inventors: Prabhat Kumar Mishra, Gainesville, FL (US); Jennifer Marie Sheldon, Gainesville, FL (US); Zhixin Pan, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 149 days.

(21) Appl. No.: 17/543,034

(22) Filed: Dec. 6, 2021

Related U.S. Application Data

(60) Provisional application No. 63/123,746, filed on Dec. 10, 2020.

(51) Int. Cl.
*G06F 21/76* (2013.01)
*G06F 21/54* (2013.01)
(Continued)

(52) U.S. Cl.
CPC .............. *G06F 21/76* (2013.01); *G06F 21/54* (2013.01); *G06F 21/554* (2013.01);
(Continued)

(58) Field of Classification Search
CPC ......... G06F 21/76; G06F 30/333; G06F 21/54
See application file for complete search history.

(56) References Cited

U.S. PATENT DOCUMENTS 10,419,468 B2 * 9/2019 Glatfelter .............. H04W 12/12
11,170,106 B2 * 11/2021 Lacaze .................. G06F 21/567
(Continued)

OTHER PUBLICATIONS

Aarestad et al. "Detecting Trojans Through Leakage Current Analysis Using Multiple Supply Pad IDDQS". IEEE Transactions On Information Forensics And Security. vol. 5, No. 4, pp. 893-904. Dec. 2010.
(Continued)

*Primary Examiner* — Viral S Lakhia
(74) *Attorney, Agent, or Firm* — Thomas | Horstemeyer, LLP (57) ABSTRACT

The present disclosure describes systems and methods for test pattern generation to detect a hardware Trojan using delay-based analysis. One such method comprises determining a set of initial test patterns to activate the hardware Trojan within an integrated circuit design; and generating a set of succeeding test patterns to activate the hardware Trojan within the integrated circuit design using a reinforcement learning model. The set of initial test patterns can be applied as an input to the reinforcement learning model. Further, the reinforcement learning model can be trained with a stochastic learning scheme to increase a probability of triggering one or more rare nodes in the integrated circuit design and identify optimal test vectors to maximize delay-based side-channel sensitivity when the hardware Trojan is activated in the integrated circuit design. Other methods and systems are also provided.

20 Claims, 10 Drawing Sheets

(51) Int. Cl.
G06F 30/333 (2020.01)
G06F 21/55 (2013.01)
G06N 3/08 (2023.01)

(52) U.S. Cl.
CPC .......... *G06F 21/556* (2013.01); *G06F 30/333* (2020.01); *G06N 3/08* (2013.01)

(56) References Cited

U.S. PATENT DOCUMENTS

| | | | | |
|---|---|---|---|---|
| 11,270,002 | B2* | 3/2022 | Tehranipoor | G06F 21/56 |
| 11,568,046 | B2* | 1/2023 | Mishra | G06F 21/554 |
| 11,663,382 | B1* | 5/2023 | Cascioli | G06F 30/33 |
| | | | | 703/15 |
| 2020/0104497 | A1* | 4/2020 | Crouch | G06F 21/76 |
| 2021/0019399 | A1* | 1/2021 | Miller | G06V 40/172 |
| 2021/0303686 | A1* | 9/2021 | Shuai | G06V 10/454 |
| 2021/0342443 | A1* | 11/2021 | Prvulovic | G06F 30/398 |
| 2022/0172103 | A1* | 6/2022 | Epperlein | G06N 20/00 |
| 2022/0198111 | A1* | 6/2022 | Huh | G06F 30/33 |
| 2023/0087837 | A1* | 3/2023 | Hwang | G06F 18/217 |
| | | | | 706/12 |

OTHER PUBLICATIONS

Ahmed et al. "Scalable Hardware Trojan Activation by Interleaving Concrete Simulation and Symbolic Execution". IEEE International Test Conference. pp. 1-10. 2018.
Chakraborty et al. "MERO: A Statistical Approach for Hardware Trojan Detection". Proceedings of the 11th International Workshop of Cryptographic Hardware and Embedded Systems. <https://www.iacr.org/archive/ches2009/57470397/57470397.pdf> 15 pages. 2009.
Cha et al. "Trojan Detection via Delay Measurements: A New Approach to Select Paths and Vectors to Maximize Effectiveness and Minimize Cost". Proceedings of the Conference on Design, Automation and Test in Europe. 6 pages. 2013.
Cruz et al. "Hardware Trojan Detection using ATPG and Model Checking". IEEE 31st International Conference on VLSI Design and 17th International Conference on Embedded Systems. pp. 91-96. 2018.
Huang et al. "Scalable Test Generation for Trojan Detection Using Side Channel Analysis". IEEE. Transactions On Information Forensics And Security, vol. 13, No. 11, pp. 2746-2760. Nov. 2018.
Plusquellic et al. "On Detecting Delay Anomalies Introduced by Hardware Trojans". IEEE. Proceedings of the 35th International Conference on Computer-Aided Design. No. 44, pp. 1-7. 2016.
Jin et al. "Hardware Trojan Detection Using Path Delay Fingerprint". IEEE International Workshop on Hardware-Oriented Security and Trust. 7 pages. 2008.
Lyu et al. "Automated Trigger Activation by Repeated Maximal Clique Sampling". IEEE. 25th Asia and South Pacific Design Automation Conference (ASP-DAC). pp. 482-487. 2020.
Ngo et al. "Hardware Trojan Detection by Delay and Electromagnetic Measurements". Design, Automation & Test in Europe Conference & Exhibition. pp. 782-787. 2015.
Rad et al. "A Sensivity Analysis of Power Signal Methods for Detecting Hardware Trojans Under Real Process and Environmental Conditions". IEEE Transactions On Very Large Scale Integration (VLSI) Systems. vol. 18, No. 12, pp. 1735-1744. Dec. 2010.
Hassan Salmani. "COTD: Reference-Free Hardware Trojan Detection and Recovery Based on Controllability and Observability in Gate-Level Netlist". IEEE Transactions On Information Forensics And Security. vol. 12, No. 2, pp. 338-350. Feb. 2017.
Salmani et al. "Layout-Aware Switching Activity Localization to Enhance Hardware Trojan Detection". IEEE Transactions On Information Forensics And Security, vol. 7, No. 1, pp. 76-87. Feb. 2012.
Salmani et al. "A Novel Technique for Improving Hardware Trojan Detection and Reducing Trojan Activation Time". IEEE Transactions On Very Large Scale Integration (VLSI) Systems. vol. 20, No. 1, pp. 112-125. Jan. 2012.
Tehranipoor et al. "A Survey of Hardware Trojan Taxonomy and Detection". IEEE Design & Test of Computers. Verifying Physical Trustworthiness of ICs and Systems. vol. 27, Issue 1, pp. 10-25. Jan./Feb. 2010.
Waksman et al. FANCI: Identification of Stealthy Malicious Logic Using Boolean Functional Analysis. pp. 1-12. 2013.
Wu et al. "TPAD: Hardware Trojan Prevention and Detection for Trusted Integrated Circuits", IEEE Transactions On Computer-Aided Design of Integrated Circuits And Systems. vol. 35, No. 4, pp. 521-534. Apr. 2016.

* cited by examiner

Table 1: Performance comparison with existing approaches

| bench | Random | | | ATGD [1] | | | Proposed | | | |
|---|---|---|---|---|---|---|---|---|---|---|
| | golden delay(ps) | difference (ps) | sensi-tivity | golden delay(ps) | difference (ps) | sensi-tivity | golden delay(ps) | difference (ps) | sensi-tivity | impro. /Random | impro. /ATGD |
| s1196 | 1302 | 698 | 53.60% | 982 | 1237 | 125.96% | 1224 | 1590 | 129.99% | 2.5x | 1.1x |
| s1423 | 1625 | 275 | 19.23% | 666 | 1368 | 205.40% | 618 | 1840 | 297.73% | 15.7x | 1.46x |
| s13207 | 1911 | 143 | 7.48% | 1621 | 996 | 70.09% | 1254 | 1382 | 111.20% | 14.9x | 1.6x |
| s15850 | 2340 | 111 | 4.74% | 2398 | 703 | 29.31% | 2209 | 2149 | 97.28% | 20.5x | 3.4x |
| s38417 | 33319 | 1520 | 4.56% | 12580 | 9088 | 72.24% | 16579 | 22126 | 133.45% | 20x | 1.9x |
| Average | 8099 | 549 | 6.76% | 3649 | 2678 | 73.38% | 4377 | 5818 | 132.92% | 15x | 1.9x |

FIG. 8

Table 2: Comparison of Test Generation Time.

| bench | #gates | #wires | ATGD | Proposed | Speedup |
|---|---|---|---|---|---|
| s1196 | 550 | 568 | 35.2s | 7.4s | 4.75x |
| s1423 | 456 | 502 | 36.8s | 7.3s | 5x |
| s13207 | 2335 | 2504 | 203.7s | 28.1s | 7.3x |
| s15850 | 2812 | 3004 | 492s | 66.9s | 7.4s |
| s38417 | 23815 | 23844 | 6022.6s | 282.6s | 21.3x |
| Average | 8015 | 8128 | 1358s | 79s | 17x |

HARDWARE TROJAN DETECTION USING PATH DELAY BASED SIDE-CHANNEL ANALYSIS AND REINFORCEMENT LEARNING

CROSS-REFERENCE TO RELATED APPLICATION

This application claims priority to co-pending U.S. provisional application entitled, "Hardware Trojan Detection Using Path Delay Based Side-Channel Analysis and Reinforcement Learning," having Ser. No. 63/123,746, filed Dec. 10, 2020, which is entirely incorporated herein by reference.

STATEMENT REGARDING FEDERALLY SPONSORED RESEARCH OR DEVELOPMENT

This invention was made with government support under 1908131 awarded by The National Science Foundation. The government has certain rights in the invention.

BACKGROUND

Reliability and trustworthiness are dominant factors in designing System-on-Chips (SoCs) for a variety of applications. Malicious implants, such as hardware Trojans, can lead to undesired information leakage or system malfunction. Side-channel analysis is often used for detecting Trojans using side-channel signatures, such as path delay. However, side-channel analysis using path-delay is hindered by two fundamental limitations. First, the difference in path delay between the golden design and Trojan inserted design is negligible compared with environmental noise and process variations; and second, existing approaches rely on manually crafted rules for test generation, and require a large number of simulations, which makes it impractical for industrial designs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods of Delay-based Trojan Detection using Reinforcement Learning (DTDRL). Effective utilization of reinforcement learning enables automatic test generation that significantly reduces test generation time while drastically improving hardware Trojan detection ability compared to state-of-the-art approaches.

As such, the present disclosure makes three important contributions. First, unlike existing methods that rely on the delay difference of a few gates, an exemplary DTDRL method/system utilizes critical path analysis to generate test vectors that can maximize side-channel sensitivity. Second, to the best of the inventors' knowledge, an exemplary delay-based Trojan detection using reinforcement learning (DTDRL) approach is the first attempt in applying reinforcement learning for efficient test generation to detect Trojans using delay-based analysis. Additionally, experimental results demonstrate that an exemplary DTDRL method can significantly improve both side-channel sensitivity (59% on average) and test generation time (17× on average) compared to state-of-the-art test generation techniques.

With the rapid development of semiconductor technologies coupled with increasing demands of complex System-on-Chips (SoCs), the vast majority of semiconductor companies utilize global supply chains. A long and distributed supply chain provides opportunity for third-party Intellectual Property (IP) vendors as well as service providers to implant Hardware Trojans (HT) inside SoCs. Therefore, Trojan detection is widely acknowledged as a major focus to enable secure and trustworthy SoCs.

Figure 1:
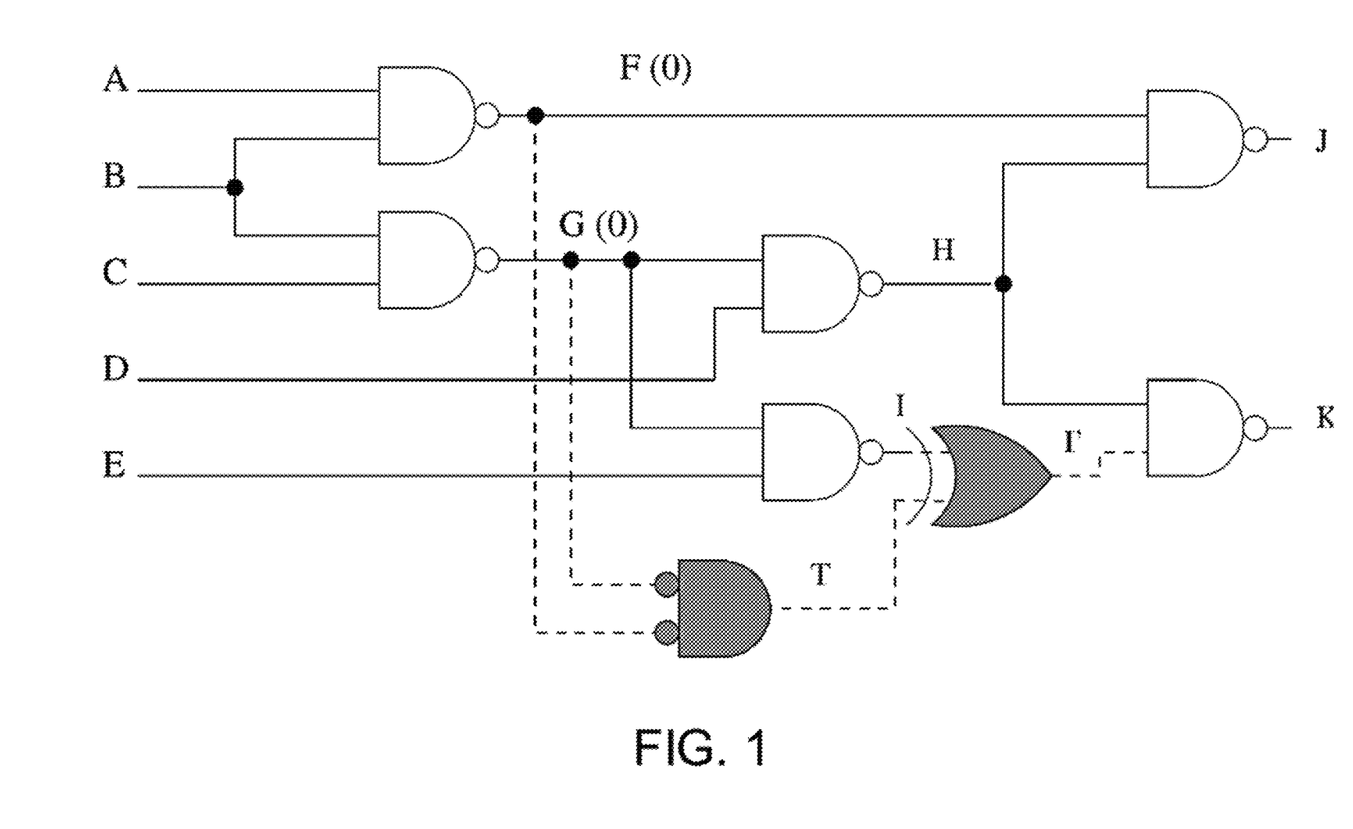
FIG. 1 shows an example of a Trojan-implanted circuit design that is triggered by rare signals in accordance with the present disclosure.

Existing Trojan detection techniques can be broadly classified into two categories: logic testing and side-channel analysis. Logic testing methods such as Automatic Test Pattern Generation (ATPG) or statistical test generation try to activate Trojans using generated tests, but they have two major limitations. First, they suffer from high computational complexity for large designs, and second, since it is infeasible to generate all possible input patterns, the generated tests are not effective in activating stealthy Trojans. The triggering conditions for Trojans are usually crafted as a combination of rare conditions, such that Trojan-implanted designs will retain exactly the same functionality as golden designs until a rare condition is satisfied to yield malicious behavior. FIG. 1 shows an example from the ISCAS'85 benchmark, in which both F and G are signals with '0' as the rare value for this design. As such, the shaded AND gate with inverted inputs will only be triggered if both F and G become '0', and, once triggered, the succeeding XOR gate will invert signal I, which is called an asset.

Side-channel analysis is a promising alternative, since the analysis compares the difference of side-channel signatures (such as path delay, electromagnetic emanation, dynamic current, etc.) with the expected (golden) values to detect Trojans. However, the effectiveness of side-channel analysis depends on the HT's side-channel leakage. The noise induced by the environment or process variation usually overshadows the Trojan footprint, which makes the detected difference negligible. Recent efforts have tried to combine logic testing and side-channel analysis in order to improve side-channel sensitivity. Specifically, the goal of combining logic testing and side-channel analysis is to maximize activity in suspicious regions while minimizing the activity in the rest of the design. While existing approaches provide promising avenues, they face two major challenges. First, the test generation time complexity is exponential for these methods, which severely limits their usability. Second, the side-channel difference achieved by these existing approaches for combining logic testing and side-channel analysis is not large enough to offer high confidence in HT detection results. In accordance with the present disclosure, these challenges are addressed by an exemplary test generation approach in accordance with the Delay-based Trojan Detection using Reinforcement Learning (DTDRL) methods of the present disclosure.

In accordance with various embodiments, an automated and efficient test generation method using reinforcement learning is implemented to maximize the difference in path delay between the Trojan-implanted design and the golden design by exploiting critical path analysis.

There are various physical signatures of electronic devices suitable for side-channel analysis, such as path delay, dynamic current, and electromagnetic emanations. Among them, the path delay is targeted for three major reasons. First, the delay between any gates in the design can be measured independently, which provides more comprehensive information compared to other side-channel signals. Second, implanted Trojans can impact path delay in multiple ways. For example, FIG. 1 provides an example of a Trojan-implanted circuit design that is triggered by rare signals, in which the figure demonstrates that there will be an increase of propagation delay for the gates producing signals F and G, since they are connected to an extra gate, which leads to increased capacitive load. Second, since one XOR gate and one AND gate were inserted to deliver the payload, the path delay will always have at least two gates difference from the golden design for any paths through these inserted XOR/AND gates. In addition, delay-based Trojan detection techniques provide superior performance under parameter variations by leveraging statistical techniques. Such stability guarantees high confidence of detection results from delay-based analysis. However, crafting test vectors that can reveal the impact of implanted Trojans on path delay is not a trivial task. Traditional approaches utilize static analysis where they enumerate all possible paths (removing unrelated paths) and exploit ATPG to find feasible input patterns to trigger the desired path. There are two fundamental limitations of these approaches. First, the computational complexity grows exponentially with the design size as it is time consuming and even impractical for large designs due to exponential nature of possible paths. Second, the detection result is extremely sensitive to environmental noise since the differences in delay induced by these methods are often negligible. Without activation of the HT, the difference is usually from a few gates (e.g., only two gates in FIG. 1). In fact, even with Trojan successfully triggered, they are not guaranteed to generate a critical path from the Trojan to an observable output for propagating the delay.

An exemplary DTDRL approach addresses these challenges by utilizing critical path analysis, which significantly increases the path delay difference induced by implanted HTs and is able to achieve better results. Reinforcement Learning (RL) has shown its potential in solving complex optimization problems. Searching for optimal test vectors in target designs to maximize the side-channel sensitivity can be viewed as an optimization problem. RL is a branch of machine learning, but unlike the commonly-known supervised learning, RL is closer to human learning. For example, although an infant baby is not able to understand spoken words, RL can still master language after a period of exploration. This exploration process is actually a process of gradually learning the rules (lexicon and grammar) of speaking through trials and responding to feedback from the environment. Similarly, RL also learns to find an optimal strategy through a series of attempts and constantly adjusts its behavior based on the feedback.

Figure 2:
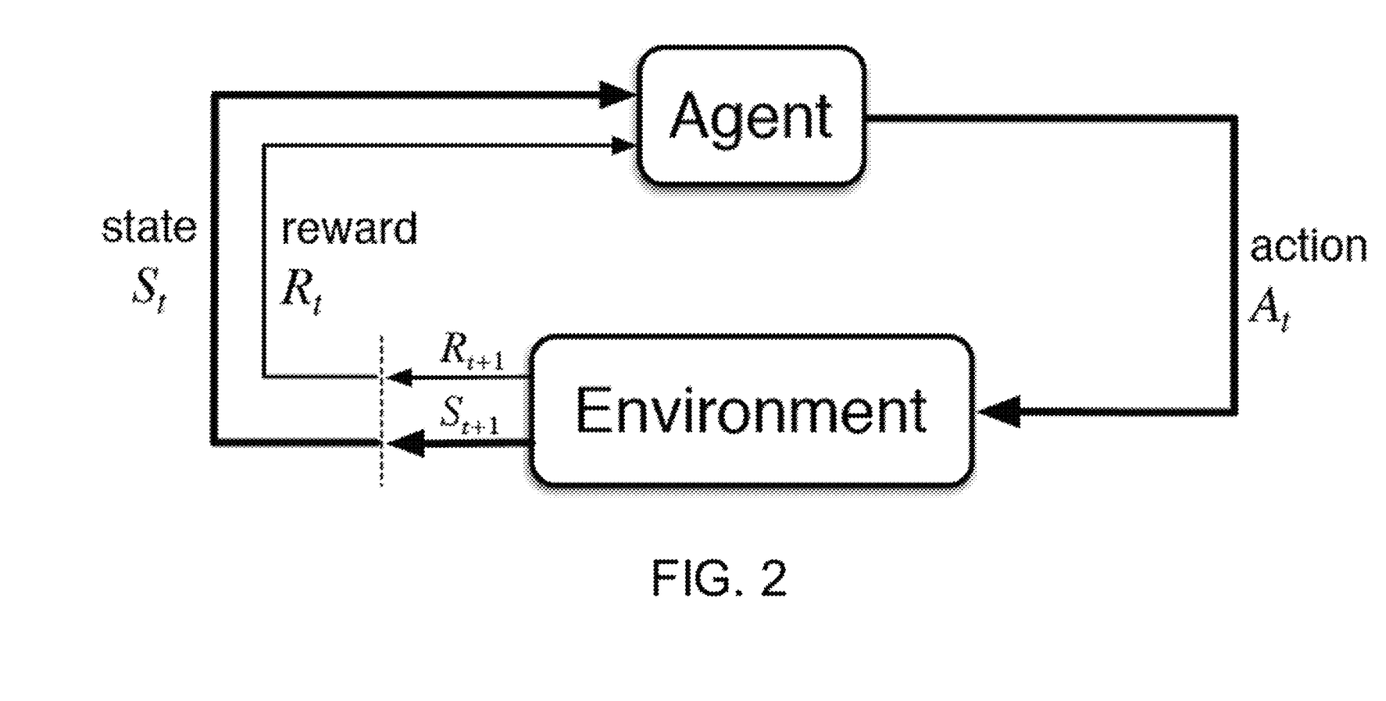
FIG. 2 shows a framework of reinforcement learning in accordance with the present disclosure.

An overview of RL framework is shown in FIG. 2. The RL framework contains five core components: Agent, Environment, Action, State, and Reward. Accordingly, the Agent refers to the object that can interact with the environment through actions. The Agent of reinforcement learning is usually the set of test cases to be optimized, which is continuously updated through learning process. Next, the Environment is the receiver of the action, such as the optimization problem itself, and the Action involves all possible operations that may affect the environment, such as using the current strategy for one-step calculation. Finally, the State refers to information about the environment that can be perceived by the Agent, such as conditions and parameters, and the Reward is the feedback information from the environment that describes the effect of the latest action. For optimization problems, the Reward often refers to the gain of objective function after performing the current operation.

The process of reinforcement learning involves obtaining feedback by interacting with the environment, and then adjusting the actions based on the feedback in order to maximize the total reward. In accordance with FIG. 2, at time stamp t, State $S_t$ and reward $R_t$ are fed into the Agent, which produce the action $A_t$ with an updated strategy. The Agent interacts with the Environment to obtain a new state $S_t+1$ and Reward $R_t+1$, then starts the next round of learning process. Accordingly, the goal of reinforcement learning is to find an optimal strategy to maximize the rewards obtained during the entire interaction process. In terms of implementation, reinforcement learning is a process of gradually optimizing the parameters of the test generation algorithm through multiple rounds to enhance the learning effect. To the best of the inventors' knowledge, the present disclosure presents the first attempt in utilizing reinforcement learning for side-channel-analysis-aware test generation.

The difficulty of delay-based side-channel HT detection comes from designing proper test vectors to increase the observability of side-channel differences. Specifically, the test vectors should be able to reveal the impact of an inserted Trojan on path delay as much as possible. Existing approaches have focused on passively enumerating possible paths affected by the HT. But if the HT is not triggered, only a few gates difference can be obtained, which is hard to distinguish from environmental noise. Consequently, the detection results are not promising. In contrast, exemplary DTDRL methods and systems focus on exploring the impacts of an inserted Trojan through critical path analysis, which allows for actively changing the critical path and magnifying side-channel differences.

Figure 3:
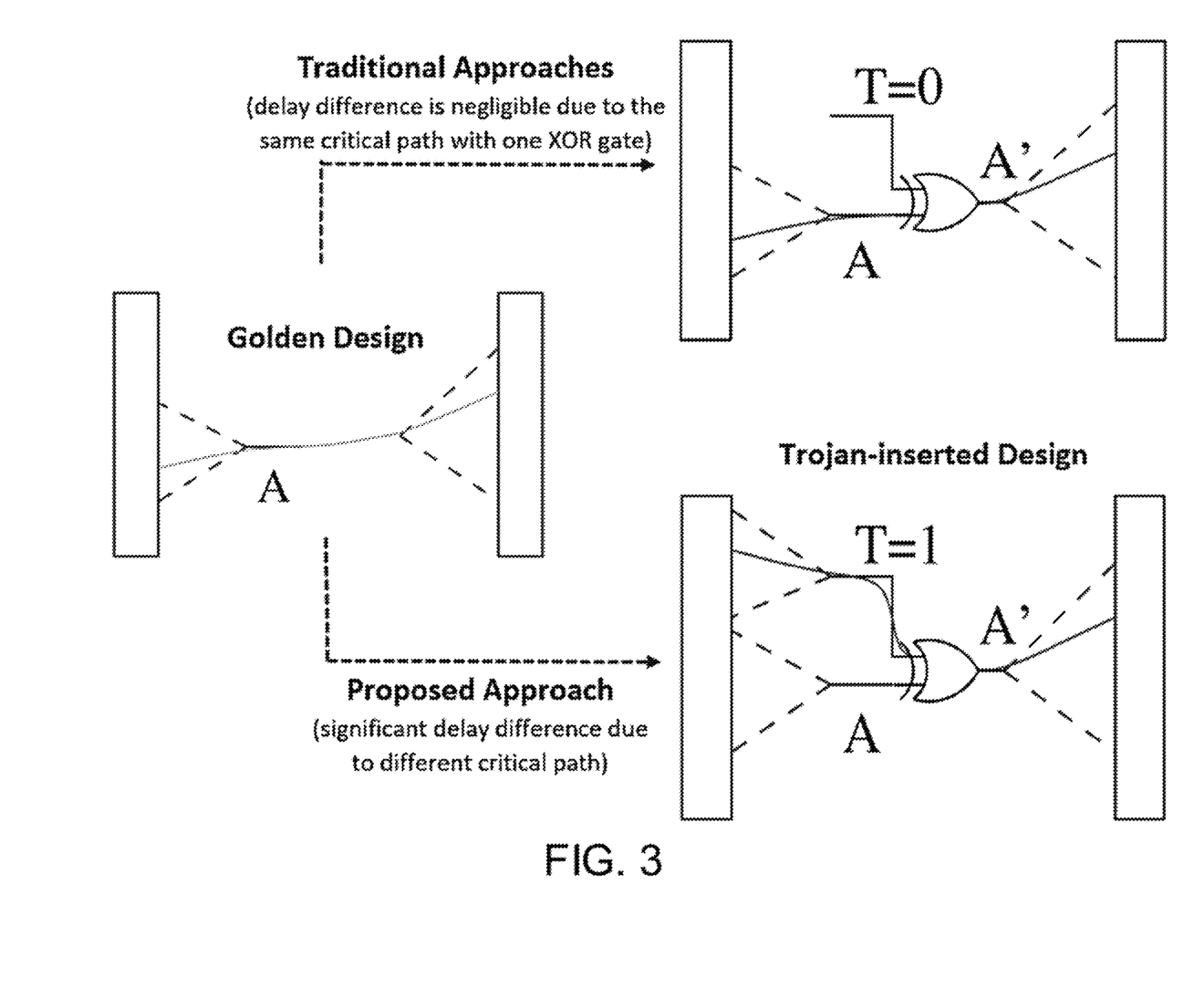
FIG. 3 shows Trojan-implanted circuit designs demonstrating that a delay difference is maximized by changing a critical path in accordance with the present disclosure.

FIG. 3 shows that the activation of a trigger T is necessary for maximizing the delay difference. The top part of the figure shows that if the test vector fails to activate the Trojan (T=0), the critical path from the input layer towards the Trojan is exactly the same as that in the golden design. Then, the delay difference is limited to the inserted gates themselves (e.g., only one XOR gate in the figure). The bottom part of the figure indicates that the critical path will be drastically different if the trigger can be activated. Note that the trigger signal T has to switch between consecutive input patterns; otherwise, there will be no contribution from the Trojan to the path delay because the related signals remain the same between two consecutive tests. Once the above requirements are satisfied, a completely different critical path from input layer to Trojan is obtained, so that a large difference between the measured delay differences can be expected. Consequently, a major problem of test generation is divided into two sub-problems: (1) how to find a good initial test for triggering the Trojan; and (2) how to efficiently generate proper succeeding tests to switch triggering signals. Due to their stealthy nature, HTs are very likely to be activated by rare triggered conditions; therefore, the two sub-problems can be addressed by generating initial tests for triggering rare nodes and generating succeeding tests for triggering rare switches.

Figure 4:
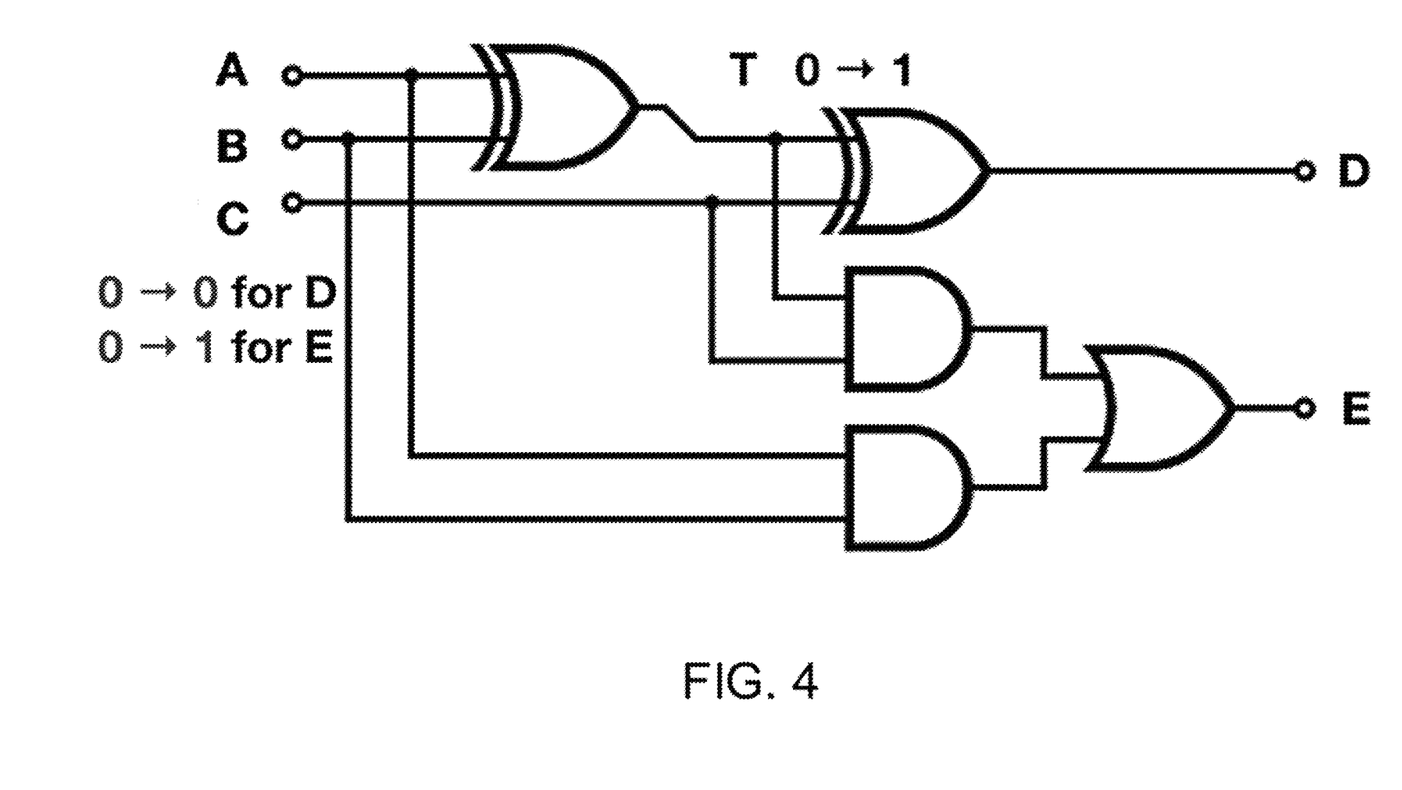
FIG. 4 shows a Trojan-implanted circuit design demonstrating that a critical path delay is affected by switching of a trigger signal in accordance with the present disclosure.

There are major research challenges in solving the above two sub-problems. For example, if focus is shifted to a succeeding path (a path from the Trojan to the output layer in which the delay is propagated through the design) starting from node A in FIG. 3, there has to be a critical path from A' to output layer to propagate the delay. Otherwise the delay is cut off and hidden from all other nodes succeeding A'. Unfortunately, creating such a path is an NP-hard problem because, in the worst-case scenario, every signal in the critical path has to be taken into consideration. For example, in FIG. 4, the trigger signal T switches from 0 to 1. Signal C, whose original value is 0, can either switch to 1 for propagating the delay induced by the switch through the AND gate to E or remain unchanged to propagate the delay through the XOR gate to D. This process will recursively continue for D and E to calculate constraints if they are chosen to be added to the critical path. The search space grows exponentially, bringing in numerous constraints. Therefore, a traditional SAT-based approach is not feasible here, and the present disclosure applies reinforcement learning to address this search space issue.

Figure 5:
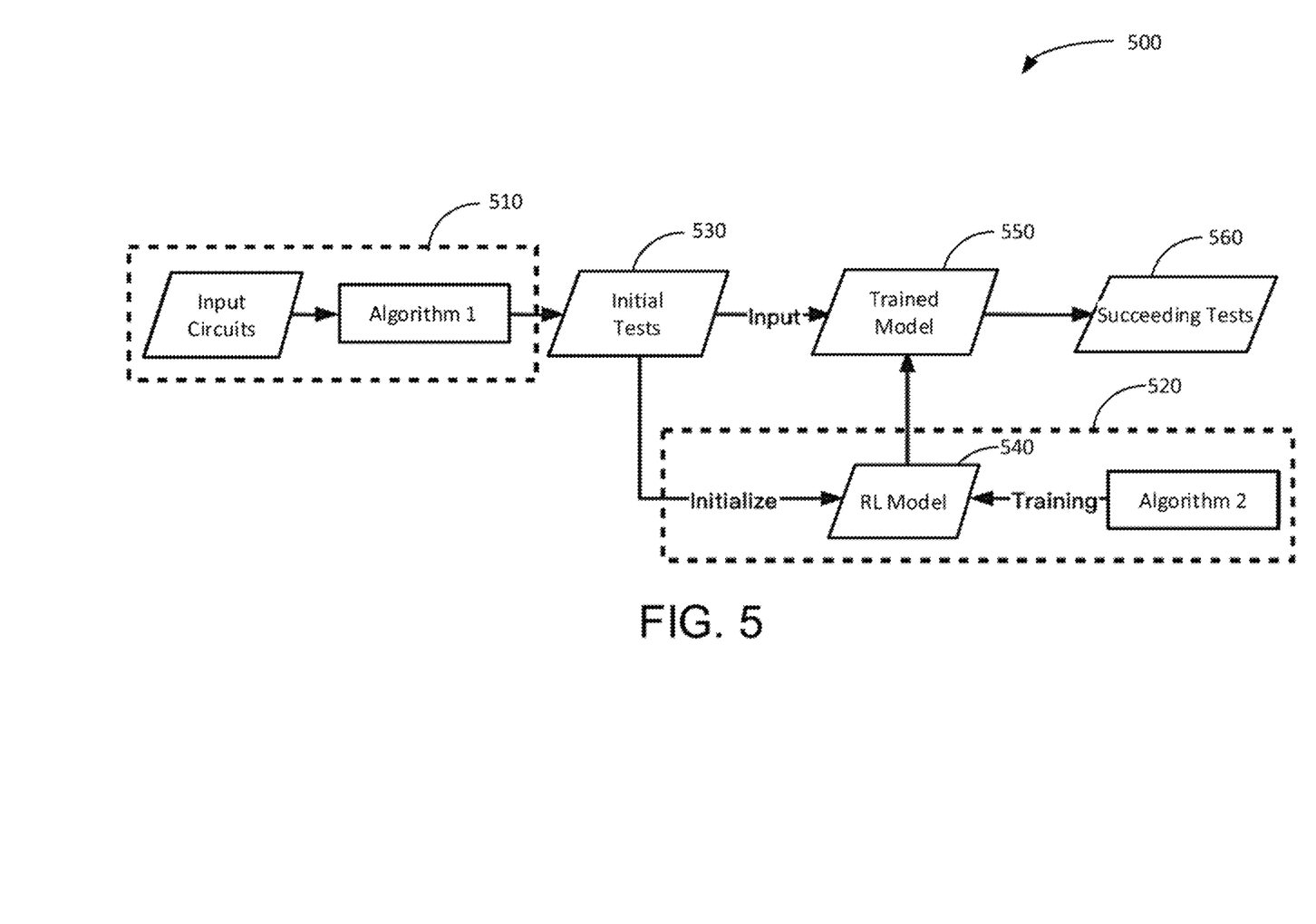
FIG. 5 depicts an exemplary framework of delay-based Trojan detection using reinforcement learning in accordance with various embodiments of the present disclosure.

FIG. 5 shows an overview of an exemplary DTDRL method 500 involving the activities of initial test generation 510 and reinforcement learning 520, in accordance with embodiments of the present disclosure. A primary goal of this type of approach is to generate a sequence of test patterns ($t_1, t_2, \ldots, t_n$), via a test generation algorithm (Algorithm 1), such that for every consecutive pair of tests ($t_i, t_{i+1}$), the delay-based side channel sensitivity is maximized. For a given circuit design, a set of proper initial test cases 530 is obtained to ensure triggering rare nodes. Next, those initial test cases 530 in the previous step are fed into a reinforcement machine learning model 540 as initial inputs, which is trained with a stochastic learning scheme (Algorithm 2) to increase the probability of triggering rare switches. After sufficient iteration of training, a well-trained RL model 550 is exploited for automatic test generation that works with initial input patterns 530 and utilizes the newly generated test vectors as input in the next round to continuously generate a sequence of test patterns 560 of the desired amount.

It is important for test patterns to activate trigger conditions because if the test pattern fails to activate the Trojan, the delay of the golden design and the Trojan-inserted design differs by, at most, one gate. Therefore, one goal is to maximize the probability of activating trigger conditions. Since an attacker is likely to construct trigger conditions based on rare nodes to avoid detection, initial vectors are generated that can maximize the activation of rare nodes. Algorithm 1 (below) shows the major steps in generating efficient initial vectors.

| Algorithm 1: Generation of Initial Test Patterns | |
|---|---|
| | Input :Design (D), Rare nodes (R), Number of initial vectors (n) |
| | Output:Test Patterns |
| 1 | Compute logic equations for each rare node in D |
| 2 | Initialize Tests={ } |
| 3 | i = 1 |
| 4 | repeat |
| 5 | | Trigger TR = ∅ |
| 6 | | Randomize the order of rare nodes R |
| 7 | | for each rare node r ∈ R do |
| 8 | | | if TR ∪ r is a valid trigger then |
| 9 | | | ⌊TR = TR ∪ r |
| | | ⌊ |
| 10 | | Solve TR and get a test$_{TR}$ |
| 11 | | Tests = Tests ∪ test$_{TR}$ |
| 12 | | i = i + 1 |
| 13 | until i > n; |
| 14 | Return Tests |

In brief, the algorithm accepts the design (circuit netlist), the list of rare nodes (R) as well as the number of test vectors (n) as inputs, and produces n test vectors. The number of vectors presents a trade-off—a larger number can lead to longer runtime, while also being likely to improve the probability of activating trigger conditions compared to a smaller number of initial vectors. Thus, Algorithm 1 computes the logic equations for each rare node by analyzing the cone-of-influence for each of them. Next, the algorithm generates n test vectors, one in each iteration. The test generated in each iteration is expected to activate different rare nodes since the order of the rare nodes is randomized. Algorithm 1 also tries to a generate a test vector that can cover a large number of rare nodes. This is ensured by adding as many rare nodes as possible without making an invalid trigger. In various embodiments, an SAT solver is used to find a test that would activate all the nodes in the trigger simultaneously. Since an attacker is likely to create a trigger with the smallest possible number of rare nodes to minimize the path delay footprint, tests generated by an exemplary DTDRL approach have a higher likelihood of detecting small triggers. In other words, if a test can be found that can cover a trigger with a large number of nodes, although the actual trigger inserted by an attacker is unknown, the likelihood of activating that Trojan increases if it is assumed that the actual trigger will contain a small number of nodes because the small trigger signals are a subset of the large trigger signals. These test cases can be used by the reinforcement learning (RL) model to form the initial state such that the RL model is able to automatically search for the best succeeding test patterns, as discussed below.

There are two requirements for a succeeding test vector (a test vector produced by the RL model, which can be used to generate another succeeding, or consecutive, test vector). First, the rare signals triggering Trojans have to switch between consecutive test patterns. If there is no rare switch, the critical path will not pass through the trigger signal. Second, the optimal succeeding test vector should be able to produce a critical path from the Trojan to the output layer which is completely different from the path in the golden design. Otherwise, the delay difference created by a Trojan cannot be propagated, and the maximum delay difference is suppressed.

For the first requirement, a SAT-based algorithm can solve for possible vectors to satisfy the rare switches. But the second condition, creating a critical path from the Trojan to the output, is an NP-hard problem, as previously discussed. Traditional approaches have failed to satisfy this demand because exploiting ATPG or SAT is expensive for large circuits. Moreover, strict conditions are required for these approaches to function. One such condition is a rough estimate on the actual Trojan payload. Even in the state-of-the-art method, Automated Test Generation for Trojan Detection using Delay-based Side Channel Analysis (ATGD), the authors circumvent this task by choosing to perform a test reordering. In particular, the authors generate a large number of test patterns, and then perform a Hamming-distance-based reordering of these patterns with the expectation that the large Hamming distance increases the probability of signal switches in the cone area. This type of approach introduces significant time complexity in both steps. For example, the first step is time-intensive since it needs to consider a large number of initial vectors to produce reasonable results. Additionally, the reordering step requires quadratic time complexity in terms of the number of initial vectors. The authors make several heuristic assumptions to increase the probability of constructing a critical path between the Trojan and output layer; however, some of these assumptions may not be valid in many scenarios.

Figure 6:
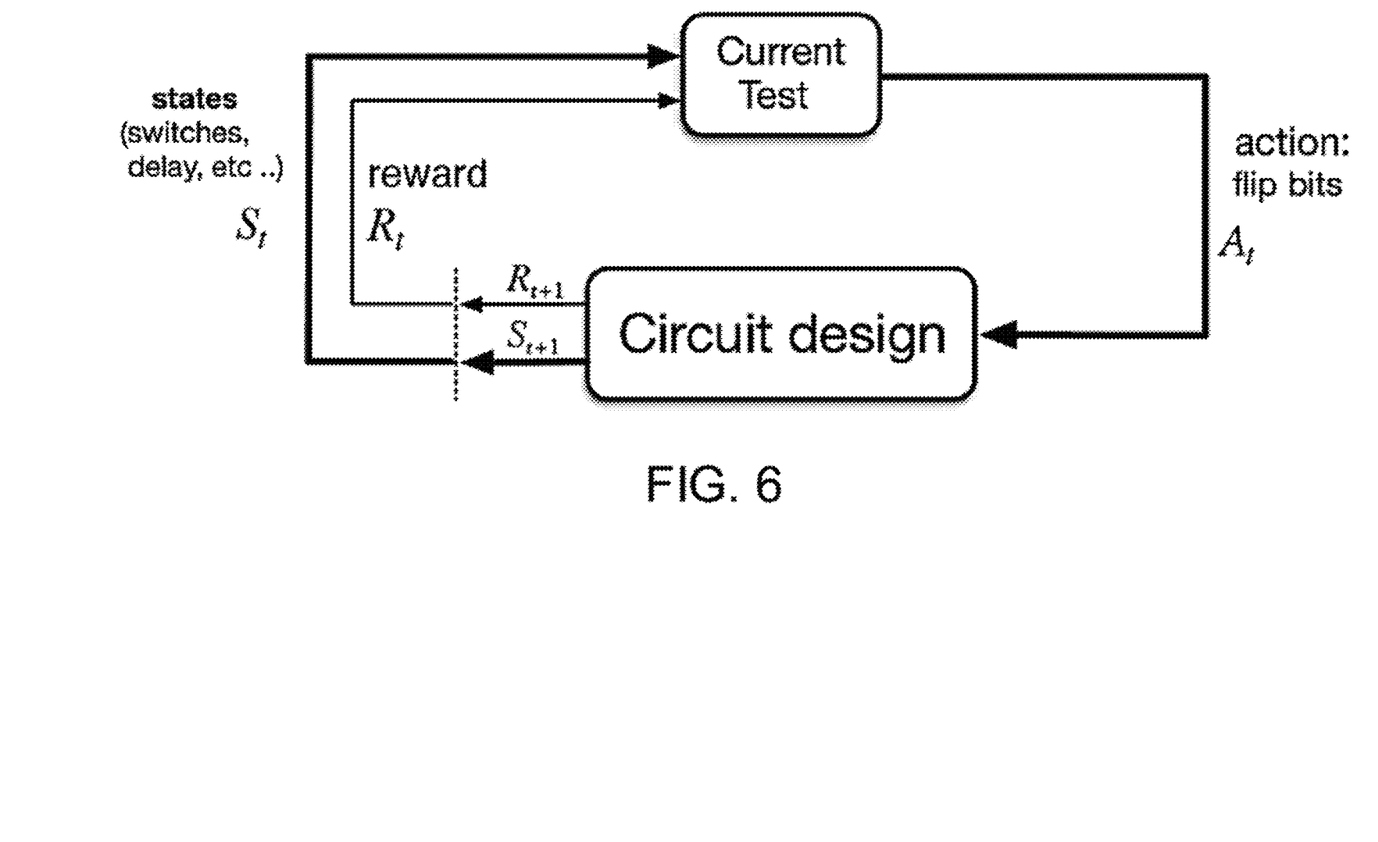
FIG. 6 shows a framework of reinforcement learning for automatic test generation in accordance with various embodiments of the present disclosure.

In order to address this fundamental challenge, reinforcement learning (RL) is applied to enable automatic succeeding test generation in the present disclosure. The present disclosure explores the effectiveness of Hamming-distance-based analysis for satisfying the requirements of succeeding test vectors and deploys Hamming-distance-based analysis as a component of the loss function in an exemplary reinforcement learning model of embodiments of the present disclosure. An exemplary version of a basic workflow of the reinforcement learning model for automatic test generation is illustrated in FIG. 6, for one embodiment.

Here, Agent corresponds to the current test vector; Environment corresponds to the circuit design; Action corresponds to the mutation of the current test vector that involves a sequence of bit flipping operations on each bit; State corresponds to the activation of trigger nodes and rare switches; and Reward corresponds to the evaluation that produced a succeeding test vector. In accordance with FIG. 6, at time stamp t, the reinforcement learning model takes action $A_t$ on a current test case to flip its bits. Then the mutated test will interact with the circuit design (Environment), while feedback $S_t+1$ and reward $R_t+1$ are sent back to evaluate the new test case. The RL model gradually learns the optimal strategy for flipping bits of previous test vectors, so that the newly generated test pattern can maximize the reward received.

Training of an exemplary reinforcement learning model faces three significant challenges. First, the possible number of actions is exponential. For a test vector of length n, there are 2n−1 possible ways to flip its bits to create a different test case. Plus, it is hard to determine the exact reward value of each operation, because actions like "flipping the second bit" can either increase the difference of path delay or do exactly the opposite of another initial pattern. Next, this naive learning framework cannot prevent an "infinite loop" from happening. That is, throughout learning, the model could consider $v_2$ as the best successor for $v_1$. It could also happen that $v_1$ maximizes the reward if it follows $v_2$. Then a $\{v_1, v_2, v_1, v_2, \ldots\}$ repetitive loop can continue forever. Finally, the resulting test set produced would be useless since it only consists of two individual test patterns.

In accordance with various embodiments of the present disclosure, a stochastic approach is applied to train an exemplary RL model to solve such challenges. In traditional value-based reinforcement learning processes, succeeding vectors are deterministic, since the choice of action is fixed for a given state to maximize the reward. But in an exemplary reinforcement learning method (as part of the DTDRL method/system), a stochastic scheme is applied. First, for each step of learning, the action is chosen randomly, i.e., for each bit of a current test vector, a probabilistic selection will determine whether to flip it or not. This non-deterministic result is not completely arbitrary but determined by a series of probability distributions. Second, the basic principle of the exemplary reinforcement learning method is to adjust the probability distributions based on the expectation of a reward. Specifically, when a positive reward expectation is obtained, the probability of the corresponding action is increased, and vice versa.

This stochastic approach not only ensures non-determinism but also avoids blindness action reward scheduling, which is the key barrier to the general training approach. In addition to the theoretical advantages of dealing with optimization problems, this strategy also possesses significant advantages in implementation, since for a test vector of length n, there is no need to encode all 2n−1 possible mutations. There is only a need to maintain a table of n binomial distributions. As a result, the above-mentioned challenges are addressed properly, and there is no longer a time cost for redundant test generation in previous steps. Furthermore, the reward value is the expectation of an action rather than a fixed value. Consequently, the infinite loop problem no longer exists, since bit flipping is probabilistically determined.

Figure 7:
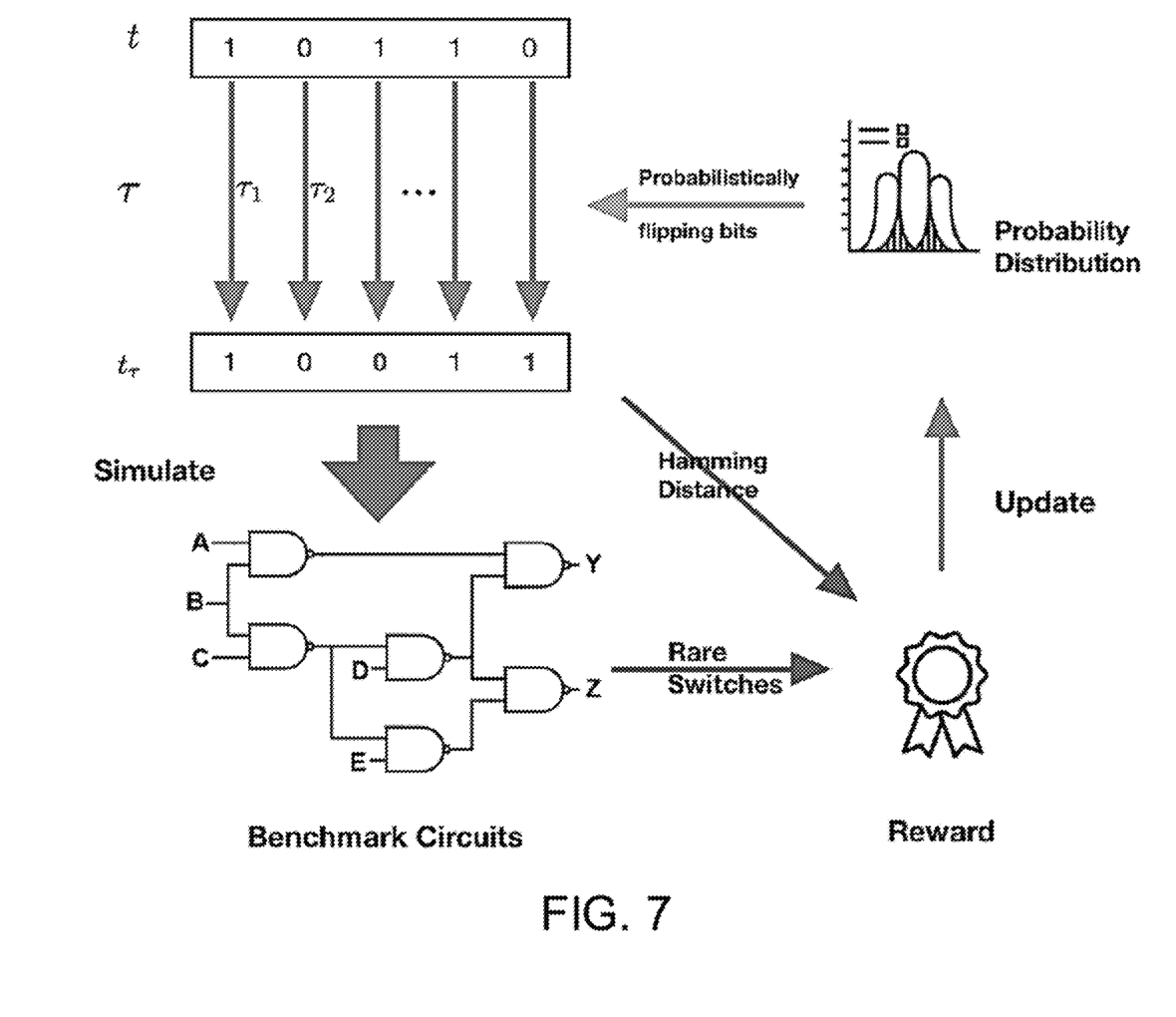
FIG. 7 illustrates an exemplary stochastic reinforcement learning method in accordance with various embodiments of the present disclosure.

FIG. 7 illustrates an exemplary learning process, which is basically a strategy optimization process. At the beginning, randomly initialized probability distributions are assigned to each bit of the test vector. Of course, there is no guarantee for this strategy to generate promising results, so the newly generated test case will be likely to provide poor performance and receive negative rewards. The goal of the learning process is to improve the expected reward, which can be formulated in the following way:

$$J(\theta) = -E_{\tau \sim p_\theta}(R_\tau), p_\theta(\tau_1 | \tau_2 | \ldots | \tau_n)$$

$$R_\tau = RS(t, t_\tau) + \lambda \cdot \text{Hamming}(t, t_\tau)$$

$$\theta^* = \operatorname{argmin} J(\theta)$$

where action τ is the union of probabilistic flipping action for each bit, i.e. $\{\tau_1, \tau_2, \ldots, \tau_n\}$. The reward $R_\tau$ of action τ is defined as a combination of rare switches RS (t, $t_\tau$) and the Hamming distance Hamming(t, $t_\tau$), an idea which was adopted from a study by Yangdi Lyu and Prabhat Mishra. See Yangdi Lyu and Prabhat Mishra, "Automated Test Generation for Trojan Detection using Delay-Based Side Channel Analysis," *Design, Automation & Test in Europe Conference* (2020). τ is a regularization factor. The loss function J(θ) is the expectation of reward since r is chosen by probability distribution $p_\theta$ parametrized by θ. A negative sign is applied, since it is desired to minimize the "loss" through gradient descent. Also, to circumvent the non-differentiability of this objective function, we resort to the standard REINFORCE learning rule which gives an alternative gradient of J(θ) with respect to θ:

$$\nabla_\theta J(\theta) = -E_{\tau \sim p\theta}\left[\left(\sum_{i=1}^n \nabla_\theta \log p_\theta(\tau_i)\right)\sum_{j=1}^n R_{\tau_j}\right]$$

For each iteration, the exemplary reinforcement learning model starts learning, and the product of learning rate α and $\nabla_\theta J(\theta)$ is used to update the parameter θ until the expected reward exceeds a certain threshold or no longer increases. Such an exemplary training process is shown in Algorithm 2 (below), in which the reinforcement learning framework enables generation of efficient tests for delay-based side-channel analysis.

Algorithm 2: Stochastic training of RL Model

Input :Design(D), Model Parameter (θ), Initial tests (T), number of epochs k, learning rate α
Output:Optimal Model Parameter θ*
1  Initialize probability distributions P = $P_\theta$
2  Initialize RL Model $M_\theta$ = init(T, P)
3  i = j = 0, n = size(T)
4  repeat
5  | repeat
6  | | for each t ∈ T do
7  | | | τ = mutate(t, P)
8  | | | $R_\tau$ = RS(t, $t_\tau$) + λ · Hamming(t, $t_\tau$)
9  | | | J(θ) = $-E_{\tau \sim p\theta}$ ($R_\tau$)
10 | | Update parameter : θ = θ + $\alpha \nabla_\theta J(\theta)$
11 | until j ≥ n;
12 until i ≥ k;
13 Return θ

As part of an Experimental Setup, model training was conducted on a host machine with Intel i7 3.70 GHz CPU, 32 GB RAM and RTX 2080 256-bit GPU. Python (3.6.7) code was developed using PyTorch (1.2.0) with cudatoolkit (10.0) as the machine learning library. The training process involved 200 epochs where the learning rate a was updated starting with 0.01, pushing it up to 0.2, and lowering it again to 0.02.

For test simulation, each benchmark design (golden and Trojan-inserted) was compiled using Quartus Prime 18.0 Lite Edition in order to generate SDO (service data object) (timing annotation similar to SDF (scientific data format)) files associated with each benchmark design. Each SDO file was generated with the Cyclone IV-E FPGA to ensure that Verilog code constructs appearing in each benchmark were associated with the same hardware for timing. Next, Verilog testbenches were generated using the test vectors produced by an exemplary framework. The testbenches initialized the scan chains with suitable values from the test vectors, and then applied the primary inputs. The tests were run sequentially with two clock cycles between test applications and testbenches were run using ModelSim version SE-64 2020.1's timing simulation capabilities with the Verilog benchmark and testbenches, as well as the Quartus-generated SDO files. Each simulation's data was recorded by generating an associated event list file in ModelSim.

To demonstrate the test vectors' effect on different designs, experiments were conducted on five benchmarks from ISCAS-89. For Path Delay Computation, ModelSim event list files provided initial signal values and changes in signal values over the course of the simulation, and the path delay was computed by subtracting the time between changes of the same signal for each application of a test. To quantify the efficacy of test vectors, path delay data was collected for simulated golden designs and designs with inserted Trojans. This data was used to quantify the effect of the inserted Trojan on the path delay with the given test vector using the difference, here defined as:

$$\text{difference} = \max_{t,f}(|\text{delay}^f_{DUT}(t) - \text{delay}^f_{gold}(t)|) \qquad (1)$$

where $f$ is the set of all registers in the tested benchmark and t is the set of all tests in the analyzed test vector. The difference is the maximum path delay difference between golden and Trojan-inserted designs (designs under test or DUTs). The "sensitivity" is adopted from the study by Yangdi Lyu and Prabhat Mishra as a metric, which refers to the scaled delay difference between the DUT and golden design. The sensitivity is defined as:

$$\text{sensitivity} = \text{difference}/\text{delay}^{f*}_{gold}(t^*)) \qquad (2)$$

where $f^*$ refers to the register producing the maximum delay difference and t* refers to the test producing the maximum delay difference.

To demonstrate the quality of tests compared to existing approaches, three different test generation schemes are evaluated comprising (1) random test generation being applied as the baseline, (2) the ATGD approach (state-of-the-art algorithm proposed in the study by Yangdi Lyu and Prabhat Mishra), and (3) an exemplary DTDRL method in accordance with embodiments of the present disclosure.

Figure 8:
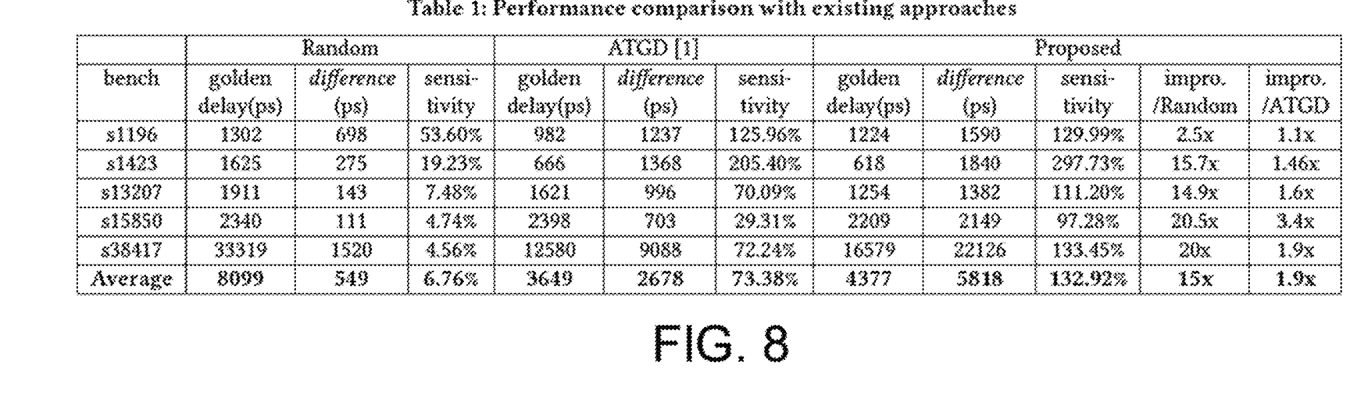
FIG. 8 shows a table (Table 1) summarizing the results of performance evaluation from generating 1000 random test vectors using existing delay-based Trojan detection approaches and an exemplary delay-based Trojan detection using reinforcement learning method across a variety of benchmarks in accordance with various embodiments of the present disclosure.

Accordingly, 1000 random test vectors were generated using the three approaches for each benchmark. Table 1 (FIG. 8) summarizes the results of performance evaluation and presents the difference of delay & the average sensitivity for each configuration. From the results, the exemplary DTDRL method provides the best performance. For random test generation, there is a significant decrease in sensitivity with the increase of benchmark size. For example, when it comes to a relatively large benchmark like s38417, the sensitivity is only around 4%, which can hide in typical environmental noise. The ATGD is better than a random simulation with an average sensitivity of 73.38%. An exemplary DTDRL method provides superior results for all these benchmarks with an average sensitivity of 132.92%, which grants 60% extra sensitivity than ATGD. Also, ATGD cannot guarantee the stability of test quality. For s15850 (2812 gates), the sensitivity of ATGD drops below 30%, while for s13207 with same level of scale (2335 gates), ATGD achieved 72.24% sensitivity. This is expected since ATGD relies on a simple heuristics. In contrast, the exemplary DTDRL method consistently provides high sensitivity (e.g., 97.28% and 133.45% for these cases).

Figure 9:
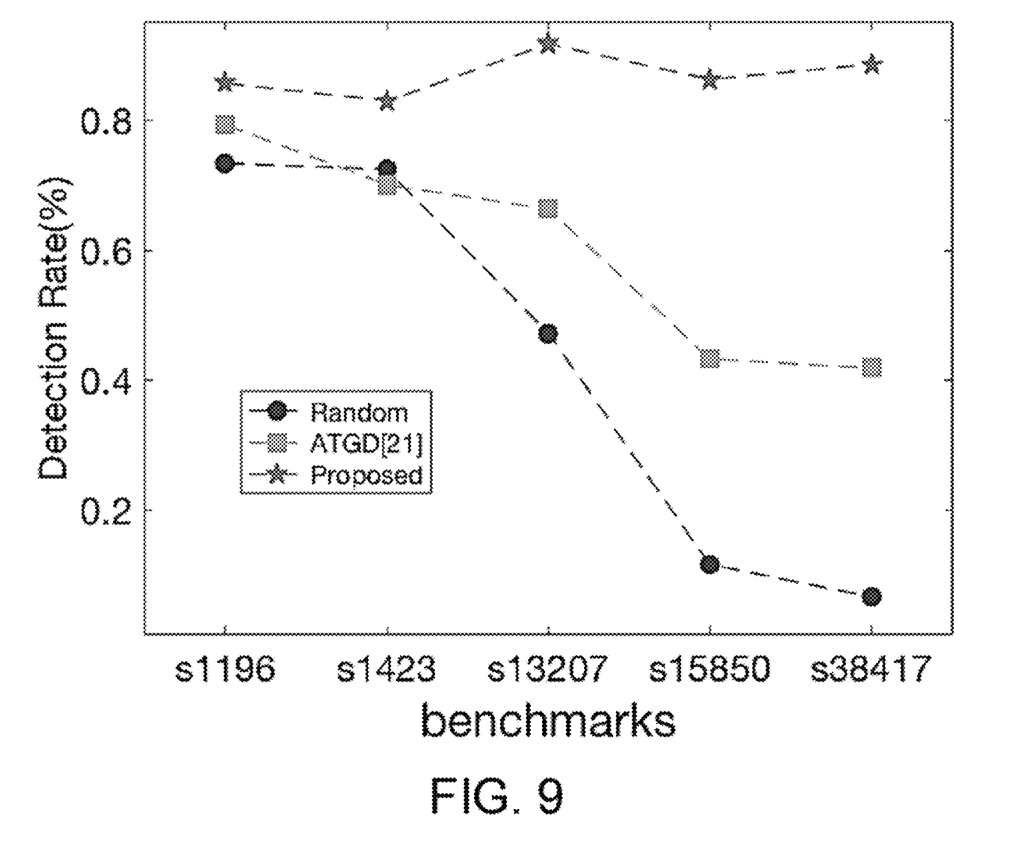
FIG. 9 shows a chart illustrating a performance of hardware trojan (HT) detection rate for existing delay-based Trojan detection approaches and an exemplary delay-based Trojan detection using reinforcement learning method across a variety of benchmarks in accordance with various embodiments of the present disclosure.

The benefit of improving sensitivity is directly reflected by the results of HT detection. The delay number for HT detection is applied by following the threshold criteria: when the delay difference between DUT and golden design exceed a certain threshold, the existence of a HT inside the DUT is claimed. A 7% threshold is used in the present disclosure based on a study by Balaji, et al. that provides an estimate on process variations and environmental noise margins. FIG. 9 presents the rate (%) of HTs detected in each benchmark. See Bharathan Balaji, et al., "Accurate Characterization of the Variability in Power Consumption in Modern Mobile Processors, *Workshop on Power-Aware Computing and Systems* (2012).

As shown in FIG. 9, when tiny benchmarks were considered, all approaches achieved a decent detection rate. Because the path between the input layer and the output layer in smaller designs is very short, even if these methods do not activate the Trojan, the extra inserted gates and change in capacitive load can still produce certain degrees of delay difference. However, when it comes to large benchmarks, the random test generation completely failed to detect most of the HTs. The ATGD performs better than random test generation, but ATGD still faces the problem of decreasing detection rate with increasing design scale. In the worst case, over 50% of HTs successfully bypass detection by ATGD in s15850 and s38417, which is unacceptable. By comparison, the rate of detection by the exemplary DTDRL method is always above 80%. DTDRL also achieved a very high detection rate (88.54%) in the largest tested benchmark (s38417).

Figure 10:
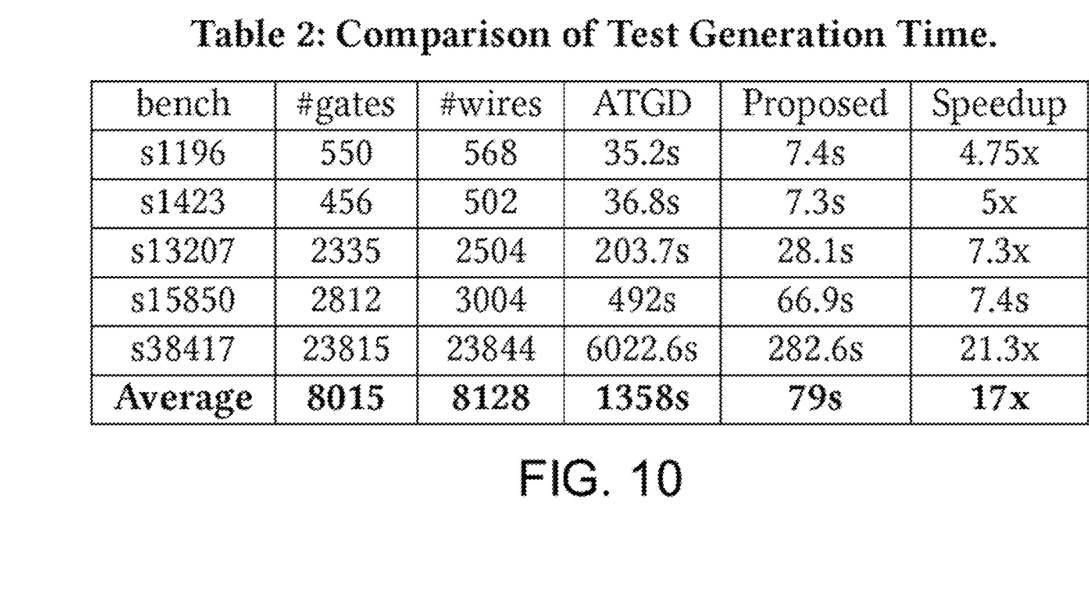
FIG. 10 shows a table (Table 2) comparing a running time between an existing Automatic Test Generation for trojan detection using Delay-based side channel analysis (ATGD) and an exemplary delay-based Trojan detection using reinforcement learning method across a variety of benchmarks in accordance with various embodiments of the present disclosure.

Another important factor of evaluation of the various approaches is the time complexity. Table 2 (FIG. 10) compares the running time between ATGD and the exemplary DTDRL method deployed on each benchmark (Random approach is out of consideration, since the Random approach is definitely the fastest one due to its no-calculation nature). The results show that the exemplary DTDRL method can generate test vectors much faster than ATGD. The significant difference of time efficiency comes from the following reasons.

The experimental analysis involved generating 1000 test vectors for each benchmark. In the case of ATGD, an SAT-based method was exploited to generate 1000 test vectors, and a reordering algorithm was performed on these 1000 vectors to sort them. For the DTDRL approach, on the other hand, the SAT method is only applied to generate several vectors as candidates for initial states to be fed into a reinforcement learning model. Meanwhile, the model training is composed of 200 iterations where each iteration is basically a one-step succeeding test generation and evaluation. When the model is well-trained, the trained model is used to generate the remaining test vectors. So, assuming k is the desired number of test vectors, the exemplary DTDRL approach finishes the task with linear O(k) time complexity, while, for ATGD, the reordering process requires a quadratic ($O(k^2)$) time complexity.

In summary, hardware Trojans are a serious threat to designing trustworthy integrated circuits. While side-channel analysis is promising, existing delay-based techniques are not effective in detecting hardware Trojans. Specifically, existing approaches introduce high time complexity requiring extra computation resources, and are therefore not suitable for large designs. Most importantly, existing approaches lead to small differences in path delay between the golden design and the Trojan-inserted design, which makes the approaches unreliable in the presence of environmental noise and process variations. In the present disclosure, reinforcement-learning-based test generation for effective delay-based side-channel analysis and related techniques are presented. Accordingly, in various embodiments of Delay-based Trojan Detection using Reinforcement Learning (DTDRL) methods/systems, a set of efficient initial patterns are generated through an SAT-based approach and reinforcement learning using stochastic methods is utilized to generate beneficial succeeding patterns. From experimental analysis, an exemplary DTDRL method is shown to be fast, automatic, and to significantly improve the side-channel sensitivity compared with existing research efforts. Specifically, an exemplary DTDRL method takes, on average, 94% less time for generating 1000 test cases for each benchmark and is able to detect most implanted Trojans in all tested benchmarks, while the state-of-the-art method failed to detect 58% of Trojans on large designs.

Figure 11:
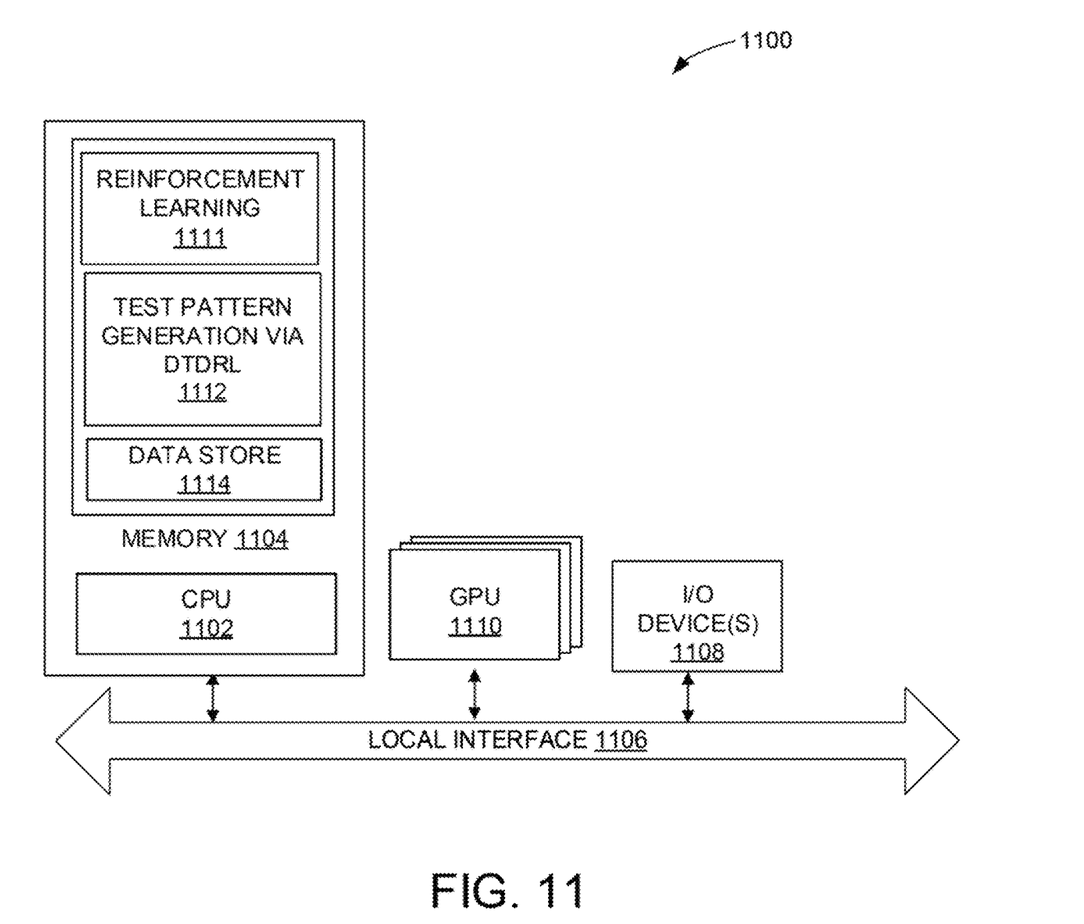
FIG. 11 depicts a schematic block diagram of a computing device that can be used to implement various embodiments of the present disclosure.

FIG. 11 depicts a schematic block diagram of a computing device 1100 that can be used to implement various embodiments of the present disclosure. An exemplary computing device 1100 includes at least one processor circuit, for example, having a processor (CPU) 1102 and a memory 1104, both of which are coupled to a local interface 1106, and one or more input and output (I/O) devices 1108. The local interface 1106 may comprise, for example, a data bus with an accompanying address/control bus or other bus structure as can be appreciated. The computing device 1100 further includes Graphical Processing Unit(s) (GPU) 1110 that are coupled to the local interface 1106 and may utilize memory 1104 and/or may have its own dedicated memory. The CPU and/or GPU(s) can perform any of the various operations described herein.

Stored in the memory 1104 are both data and several components that are executable by the processor 1102. In particular, stored in the memory 1104 and executable by the processor 1102 are code for implementing machine learning utilizing a reinforcement learning model 1111 and code for implementing test pattern generation in accordance with Delay-based Trojan Detection using Reinforcement Learning (DTDRL) 1112. Also stored in the memory 1104 may be a data store 1114 and other data. The data store 1114 may store data related to the computations performed by the reinforcement learning model 1111 and/or the test pattern generation in accordance with Delay-based Trojan Detection using Reinforcement Learning (DTDRL) algorithms 1112. In addition, an operating system may be stored in the memory 1104 and executable by the processor 1102. The I/O devices 1108 may include input devices, for example but not limited to, a keyboard, mouse, etc. Furthermore, the I/O devices 1108 may also include output devices, for example but not limited to, a printer, display, etc.

Embodiments of the present disclosure can be implemented in hardware, software, firmware, or a combination thereof. In an exemplary embodiment, Delay-based Trojan Detection using Reinforcement Learning (DTDRL) logic or functionality is implemented in software or firmware that is stored in a memory and that is executed by a suitable instruction execution system. If implemented in hardware, as in an alternative embodiment, Delay-based Trojan Detection using Reinforcement Learning (DTDRL) logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications Therefore, at least the following is claimed:

1. A method for test pattern generation to detect a hardware Trojan using delay-based analysis comprising:
    determining, by a computing device, a set of initial test patterns to activate the hardware Trojan within an integrated circuit design; and
    generating, by the computing device, a set of succeeding test patterns to activate the hardware Trojan within the integrated circuit design using a reinforcement learning model, wherein the set of initial test patterns is applied as an input to the reinforcement learning model, wherein the reinforcement learning model is trained with a stochastic learning scheme to increase a probability of triggering one or more rare nodes in the integrated circuit design and identify optimal test vectors to maximize delay-based side-channel sensitivity when the hardware Trojan is activated in the integrated circuit design.

2. The method of claim 1, wherein consecutive pairs of the succeeding test patterns are configured to cause the one or more rare nodes of the integrated circuit design to switch an output value of the one or more rare nodes when applied as inputs to the integrated circuit design.

3. The method of claim 1, further comprising:
    obtaining, by the computing device, a delay-based side channel sensitivity for a golden design of the integrated circuit design during application of the succeeding test patterns to the golden design of the integrated circuit design;
    collecting, by the computing device, the delay-based side channel sensitivity for an integrated circuit design under test during application of the succeeding test patterns to the integrated circuit design under test;
    computing, by the computing device, a difference in delay-based side channel sensitivity between the golden design of the integrated circuit design and the integrated circuit design under test; and
    outputting, by the computing device, an indication of whether the hardware Trojan is present in the integrated circuit design under test based on the computed difference.

4. The method of claim 3, further comprising ordering, by the computing device, the succeeding test patterns to maximize a delay deviation between the golden design of the integrated circuit design and the integrated circuit design under test.

5. The method of claim 4, wherein a Hamming-distance based reordering of the succeeding test patterns is performed.

6. The method of claim 3, wherein the computed difference is compared to a threshold value and the integrated circuit design is determined to have the hardware Trojan when the computed difference exceeds the threshold value.

7. The method of claim 1, wherein the determining step further comprises accepting a netlist for the integrated circuit design, a list of rare nodes within the integrated circuit design, and a number of initial test patterns to be generated.

8. The method of claim 1, wherein each of the succeeding test patterns is configured to activate a different set of rare nodes in the integrated circuit design.

9. The method of claim 1, wherein the initial test patterns are generated using a Boolean satisfiability (SAT)-based approach.

10. The method of claim 1, wherein the reinforcement learning model is configured to adjust bit values of the succeeding test patterns based on a probability distribution table, wherein the probability distribution table is adjusted based on feedback applied to the reinforcement learning model.

11. A system for test pattern generation to detect a hardware Trojan using delay-based analysis, the system comprising:
    a processor of a computing device; and
    a tangible, non-transitory memory configured to communicate with the processor, the tangible, non-transitory memory having instructions stored thereon that, in response to execution by the processor, cause the computing device to at least:
        determine a set of initial test patterns to activate the hardware Trojan within an integrated circuit design; and
        generate a set of succeeding test patterns to activate the hardware Trojan within the integrated circuit design using a reinforcement learning model, wherein the set of initial test patterns is applied as an input to the reinforcement learning model, wherein the reinforcement learning model is trained with a stochastic learning scheme to increase a probability of triggering one or more rare nodes in the integrated circuit design and identify optimal test vectors to maximize delay-based side-channel sensitivity when the hardware Trojan is activated in the integrated circuit design.

12. The system of claim 11, wherein consecutive pairs of the succeeding test patterns are configured to cause the one or more rare nodes of the integrated circuit design to switch an output value of the one or more rare nodes when applied as inputs to the integrated circuit design.

13. The system of claim 11, wherein the instructions, in response to execution by the processor, further cause the computing device to:
    obtain a delay-based side channel sensitivity for a golden design of the integrated circuit design during application of the succeeding test patterns to the golden design of the integrated circuit design;
    collect the delay-based side channel sensitivity for an integrated circuit design under test during application of the succeeding test patterns to the integrated circuit design under test;
    compute a difference in delay-based side channel sensitivity between the golden design of the integrated circuit design and the integrated circuit design under test; and
    output an indication of whether the hardware Trojan is present in the integrated circuit design under test based on the computed difference.

14. The system of claim 13, wherein the instructions, in response to execution by the processor, further cause the computing device to order the succeeding test patterns to maximize a delay deviation between the golden design of the integrated circuit design and the integrated circuit design under test.

15. The system of claim 14, wherein a Hamming-distance based reordering of the succeeding test patterns is performed.

16. The system of claim 13, wherein the computed difference is compared to a threshold value and the integrated circuit design is determined to have the hardware Trojan when the computed difference exceeds the threshold value.

17. The system of claim 11, wherein the determining operation further comprises accepting a netlist for the integrated circuit design, a list of rare nodes within the integrated circuit design, and a number of initial test patterns to be generated.

18. The system of claim 11, wherein each of the succeeding test patterns is configured to activate a different set of rare nodes in the integrated circuit design.

19. The system of claim 11, wherein the initial test patterns are generated using a Boolean satisfiability (SAT)-based approach.

20. The system of claim 11, wherein the reinforcement learning model is configured to adjust bit values of the succeeding test patterns based on a probability distribution table, wherein the probability distribution table is adjusted based on feedback applied to the reinforcement learning model.

* * * * *